United States Patent [19]

Ström et al.

[11] 4,353,603
[45] Oct. 12, 1982

[54] BEARING DEVICE

[75] Inventors: Johan P. Ström; Leif-Olof Fager, both of Järfälla, Sweden

[73] Assignee: U.S. Philips Corporation, New York, N.Y.

[21] Appl. No.: 112,382

[22] Filed: Jan. 15, 1980

[30] Foreign Application Priority Data

Jan. 15, 1979 [SE] Sweden ............................... 7900357

[51] Int. Cl.$^3$ ........................ F16C 25/08; F16C 27/04
[52] U.S. Cl. ................................ 308/26; 308/184 R; 308/DIG. 14
[58] Field of Search .............. 308/26, 184 R, DIG. 14

[56] References Cited

U.S. PATENT DOCUMENTS

| 2,504,776 | 4/1950 | Woodfield et al. | 308/184 R |
| 2,506,404 | 5/1950 | Woodfield et al. | 308/184 R |
| 2,859,033 | 11/1958 | Rose | 308/184 R |
| 3,960,418 | 6/1976 | Bracken | 308/184 R |

Primary Examiner—Richard R. Stearns
Attorney, Agent, or Firm—Robert S. Smith

[57] ABSTRACT

A bearing device for the rotatable journalling of a first body relative to a second body. The bearing device comprises a bearing, e.g. a ball bearing, having a first bearing ring which engages said first body, and a second bearing ring which cooperates with said second body. As a consequence of different operating temperatures, displacements can occur between said bodies and the associated bearing rings, thereby changing the character and accuracy of the bearing. This problem is solved by making said first body engage the associated first bearing ring by means of a spring element comprising a ring-shaped portion and longer and shorter radially directed spring arms which are distributed around the periphery of the portion. The longer spring arms extend beyond the first bearing ring and the end faces thereof are fixed axially as well as radially with respect to the first body. The shorter spring arms have the same direction as the longer arms and the end faces thereof are fixed axially as well as radially with respect to the first bearing ring. A change of the relative bending of the longer and shorter spring arms causes displacement of the first body without friction with respect to the associated first bearing ring while keeping the contact faces in the bearing substantially unchanged.

1 Claim, 5 Drawing Figures

BEARING DEVICE

The invention relates to a bearing device for the rotatable journalling of a first body relative to a second body, comprising a bearing having a first bearing ring which is engaged by the first body and a second bearing ring which is engaged by the second body. The bearing device according to the invention may in general be of a type comprising means which functionally correspond to the first and second bearing rings. For the sake of clarity the invention will be described with reference to ball bearings and the related problems.

In many applications in which a shaft or similar member is journalled in two locations by means of ball bearings, the shaft and the housing accommodating the bearings will be subject to temperature differences during operation, thus causing different linear expansions in the axial direction of said parts. Thus, displacements of the inner and/or outer rings of the bearings relative to their positions of engagement on the shaft or the housing occur. These displacements change the character of the bearing, because the axial preload between the bearing rings and hence also the contact angle of the balls with the bearing rings is changed, which for example, may give rise to radial play in the bearing.

In some applications the usefulness of the bearing depends on whether or not an "unchangeable" bearing position can be secured in the axial direction; it follows that any displacements in the longitudinal direction require compensation.

One application where said conditions are applicable and where the precision of the bearing must be extremely high is a frequency agility magnetron which is used in frequency agility radar for the generation of radar pulses, each pulse transmitted then having a new frequency which is selected at radom, independently of the frequency of the previous pulse.

A magnetron of this type comprises a rotor which is mounted on a shaft by means of ball bearings. One end of the rotor is used for tuning purposes and must remain in position in operation, even if the temperature of the rotor rises beyond 400° C. and the temperature of the shaft reaches a value of about 125°-200° C.; in one embodiment of the magnetron, this may have the consequence that the rotor will have an expansion difference in the longitudinal direction of about 0–0.3 mm relative to the shaft. This will cause displacements of the bearings and the tuning end of the rotor and hence detuning of the magnetron. During the displacements the preload of the bearings and hence said contact angle is also liable to change, giving rise to disturbed operation.

The object of the invention is to provide a bearing of the kind set forth in which differences in expansion are compensated for without friction of the inner ring or the outer ring relative to the associated first and second body, respectively, the preload and contact angle of the bearings remaining substantially unchanged.

The object of invention is obtained by a device of the kind set forth which is characterized in accordance with the invention in that said first body engages said first bearing ring via a spring element comprising a substantially ring-shaped portion having a diameter which deviates from that of the bearing ring, the spring element further comprising a number of longer and shorter radially directed spring arms distributed around said ring-shaped portion, said longer spring arms projecting beyond said bearing ring and the end faces thereof engaging said first body, the end faces of said shorter spring arms being made to engage the bearing ring.

Further features of the device according to the invention will become evident from the patent claims.

One embodiment of the bearing device according to the invention and comprised in a frequency agility magnetron will be described in detail hereinafter with reference to the accompanying diagrammatic drawings.

Figure 1:
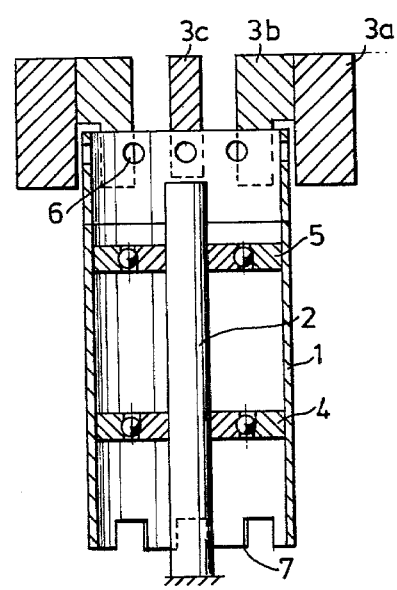
FIG. 1 is an axial sectional view of the rotor, the shaft, and the anode block of a frequency agility magnetron.

FIG. 1 shows the rotor 1, the shaft 2, the anode block 3a, b and the cathode 3c comprised in a frequency agility magnetron. The rotor is shaped as a cylinder and is mounted on the shaft by means of two ball bearings 4 and 5. The rotor is provided at one end with tuning openings 6. The other end of the rotor is provided with a toothed crown 7 of a magnetic mild steel for driving the rotor by magnetic coupling to an associated yoke (not shown) which is driven by a motor and which is provided with a similar toothed crown.

The anode block 3a, b consists of a ring-shaped outer portion 3a, the inner side of which is provided with a number of radial plates 3b between which sector-shaped cavities are formed. Near the anode block 3a the plates 3b are provided with grooves in which the rotor 1 is inserted. In the center of the anode block there is arranged a bar-shaped cathode 3c. In operation the temperature of the rotor 1 may exceed the temperature of the shaft 2 by some 200°-300° C. The temperature difference causes a length extension of the rotor in the order of 0–0.3 mm relative to said shaft. This extension causes a relative displacement of the outer rings of the ball bearings and the rotor and also of the inner and outer rings of the ball bearings 4 and 5, thus changing the character of the bearing and a displacement of the rotor end with said tuning openings 6 relative to the anode block and hence a change of the magnetron tuning.

Figure 2:
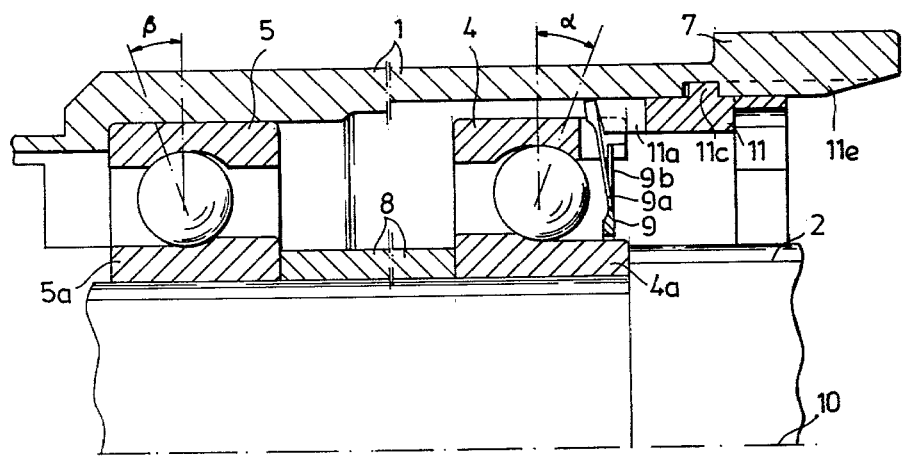
FIG. 2 is a partial axial sectional view of the magnetron as shown in FIG. 1, comprising the bearing device according to the invention.

FIG. 2 is a partial axial sectional view of one embodiment of the parts of a magnetron shown in FIG. 1. The rotary axis of the rotor 1 is denoted as 10 and, like in FIG. 1, the rotor is mounted on bearings on a shaft 2 by means of two ball bearings 4 and 5. As already shown in FIG. 1, the rotor 1 is at one end provided with a toothed crown 7 of mild steel, while its other end with said tuning openings 6 is not completely shown in FIG. 2. By way of the latter end, the rotor 1 is mounted on a precision ball bearing 5 of a conventional type. At the other end, the rotor is mounted on a ball bearing 4 having the features of the bearing device in accordance with the invention. The distance between the inner rings 4a and 5a of the bearings 4 and 5, respectively, is fixed by a spacer ring 8.

The bearing 4 comprises the inner ring 4a and the outer ring 4 which, in contrast to the outer ring 5 of the other bearing, is not directly engaged by the inner surface of the rotor 1, but instead indirectly via a spring washer 9, the periphery of the washer being provided with alternating longer and shorter spring arms 9a and 9b, respectively. The longer spring arms 9a extend through recesses in the outer ring and are engaged by the inner surface of the rotor. In the axial direction the positions of the spring arms 9a are fixed by projections 11a of a locking ring 11. As is shown in FIG. 2, the projections 11a are introduced into the corresponding recesses in the outer ring 4. The construction of the outer ring 4, the spring washer 9 and the locking ring 11 will be described in detail hereinafter with reference to the FIGS. 3 and 4.

In the rest position shown in FIG. 2, the longer spring arms 9a are somewhat bent to the left in the drawing, the shorter spring arms 9b being substantially straight. As a result of the bending of the spring arms 9a, the spring washer 9 tends to displace the rotor to the right in the drawing, the spring arms 9b at the time tending to displace the outer ring 4 in the opposite direction. By a suitable choice of the hardness of the spring washer and the shape of the spring arms, the desirable preload of the ball bearings can be realized. This preload produces the contact angles $\alpha$ and $\beta$, respectively, in the ball bearings 4 and 5. When the rotor 1 is in operation and, as a consequence of a higher temperature, its length increases relative to the shaft 2, compensation is obtained without any friction because the spring arms 9a bend to a smaller extent. This retention will also increase the radius of the spring arms 9a, so that any radial play between the spring arms 9a and the rotor 1 is eliminated. The small change of the shape of the spring washer 9 will not significantly change the preload of the ball bearings 4 and 5, so that said contact angles and the desirable precision of the bearing remain substantially unchanged. Because the length increase of the rotor 1 is compensated for only at the bearing 4, the position of the outer ring of the ball bearing 5 remains unchanged with respect to the rotor. Displacement of the tuning end of the rotor 1 relative to the anode block 3a is thus also prevented (FIG. 1).

Figure 3:
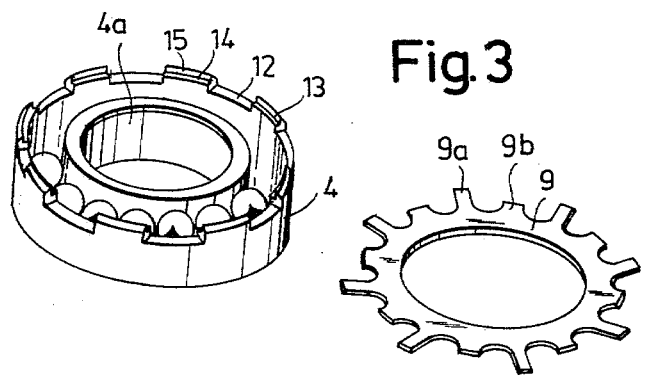
FIG. 3 is a perspective view of the ball bearing 4 of FIG. 2 and the associated spring washer.

FIG. 3 is a perspective view of the ball bearing 4 of FIG. 2 with the associated spring washer. The ball bearing comprises the outer ring 4 and the inner ring 4a and the balls running therebetween, only a few balls being shown. The edge of the outer ring is provided with alternating recesses 12 and projections 13. As has already been stated, the recesses 12 provide the space for the longer spring arms 9a to pass through the outer ring 4 until they engage the rotor 1 (see FIG. 2). As appears from the drawing the projections 13 have axially and radially directed contact faces for the shorter spring arms 9b.

As is shown in FIG. 3, the spring washer 9 is provided with a number of alternating longer and shorter, radially directed spring arms 9a and 9b, respectively. The number of longer and shorter spring arms corresponds to the number of recesses 12 and projections 13, respectively, of the outer ring 4. During the manufacture of the spring washer, the material of the spring washer and the shape of the spring arms are chosen so that the spring force of the spring washer will remain substantially unchanged within the range of length increase during operation. Thus, the preload and, consequently, the rotor position remain unchanged.

Figure 4:
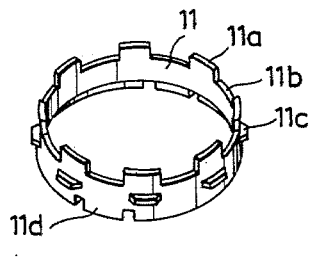
FIG. 4 shows the locking ring 11 which cooperates with the spring washer disclosed in FIG. 3.

FIG. 4 shows the locking ring for the spring washer of FIG. 2 in greater detail. The locking ring 11 is provided around its periphery with alternating projections 11a and recesses 11b. As is shown in FIG. 4, the end faces of the projections 11a engage the contact faces of the longer spring arms 9a. The shape of the projections 11a and the recesses 11b is adapted to the shape of the corresponding recesses 12 and projections 13, respectively, of the outer ring 4 so that said parts can be inserted one into the other during mounting of the bearing in the manner shown in FIG. 2. Due to the fact that the locking ring 11 and the outer ring 4 are mutually insertable, the outer ring will be locked against rotation relative to the rotor 1 by the locking ring 11.

The locking of the locking ring 11 relative to the rotor 1 is realized by means of the studs 11c and the lugs 11d. As is indicated by a dotted line in FIG. 2, the part 7 of the rotor is provided with axial notches 11e in which the studs 11c may be inserted. The notches 11e terminate with an angularly bent section (not shown) allowing rotation of the locking ring to the position indicated in FIG. 2, so that the outwardly directed edge of each stud 11c engages a corresponding edge of the angular section of the corresponding notch 11e. The length of the angular section of the locking notches 11e is so adapted that each of said lugs 11d of the locking ring will be positioned opposite an associated notch 11e after rotation. The locking ring is subsequently definitely fixed by bending the lugs 11d into the corresponding notches.

Figure 5:
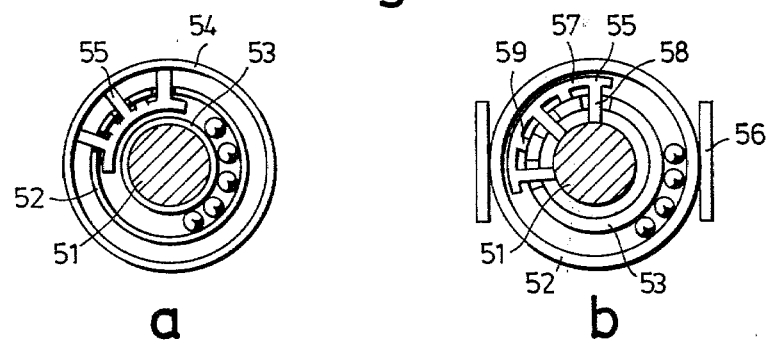
FIG. 5 shows partial sectional plan views of two alternative embodiments of the bearing device according to the invention.

FIGS. 5a and b show plan views of two alternative embodiments of the bearing device according to the invention. The embodiment shown in FIG. 5a, corresponds to the application described above in which a generally cylinder-shaped element is movably mounted on bearings on an immobile shaft 51 by means of a bearing device according to the invention, comprising a ball bearing having an outer ring 52 and an inner ring 53. The mechanical coupling between the outer ring 52 and the element 54 is obtained by means of a spring washer 55. The longer spring arms of the spring washer engage the inner surface of the cylinder 54, while the shorter spring arms engage the inner surface of the outer ring 52. Consequently, this bearing device can move the cylinder 54 in the axial direction relative to the outer ring 52 by means of the flexible spring arms 55.

The embodiment shown in FIG. 5b illustrates an alternative embodiment of the bearing device according to the invention. Therein, the spring washer 55 allows for movability of the shaft 51 in the axial direction relative to the outer ring 52 of the bearing device, which may be regarded as being immovably mounted by the mounting means 56. In this case the spring arms of the spring washer 55 are directed radially inwards and the spring washer is made to cooperate with the inner ring of the bearing device.

FIG. 2 illustrates the manner in which the spring washer 9 can be made to engage the rotor 1 and the outer ring 4 by means of a locking ring of a shape which is shown in more detail in FIG. 4. However, it will be obvious that this engagement can also be realized in other ways, depending on the actual application. Therefore, it is not necessary for the spring washer 9 to be engaged directly by the outer ring, but may instead be engaged by said ring via a suitably shaped connection means.

In other applications, the separate locking ring may be replaced by engagement means which are rigidly mounted on the rotor.

What is claimed is:

1. A bearing device for supporting associated first and second bodies for rotational movement relative to one another comprising: a bearing having first and second bearing rings which are rotatable relative to each other, said second bearing ring carrying the second body and said first bearing ring carrying the first body by means which permit relative axial movement between said first bearing ring and the first body, said bearing device comprising a spring element which comprises a substantially ring-shaped portion and a plurality of alternating longer and shorter spring arms which are distributed around and project substantially radially from said ring-shaped portion, said longer arms, at their distal ends, acting on the first body to preload the first body in one axial direction and the shorter arms, at their distal ends, acting on the first bearing ring to preload the first bearing ring in the opposite axial direction.

* * * * *